United States Patent [19]
Pollman et al.

[11] 3,713,759
[45] Jan. 30, 1973

[54] GEAR PUMP WITH SEAL PLATES

[75] Inventors: Frederic W. Pollman; Lee R. Frandsen; Charles D. Throckmorton, Sr., all of Rockford, Ill.

[73] Assignee: Sundstrand Corporation

[22] Filed: Jan. 27, 1971

[21] Appl. No.: 110,178

[52] U.S. Cl. ................................................418/71
[51] Int. Cl. ...........................................F01c 21/00
[58] Field of Search .................................418/71–74

[56] References Cited

UNITED STATES PATENTS

| | | | |
|---|---|---|---|
| 3,213,799 | 10/1965 | Trick | 418/74 |
| 3,053,192 | 9/1962 | Nonnenmacher | 418/73 |
| 3,285,188 | 11/1966 | Kita | 418/74 |

Primary Examiner—C. J. Husar
Attorney—Hofgren, Wegner, Allen, Stellman & McCord

[57] ABSTRACT

A high pressure rotary gear pump including a housing having a pair of external gear members intermeshing at a location between an inlet and an outlet, a pair of shafts carrying the gear members and having opposite ends mounted in bearings in the housing, a pair of thin generally 8-shaped floating seal plates around the shafts at opposite sides of the gears, means providing a definite primary area on the gear side of each plate subjected to outlet pressure applying a primary force tending to separate the plate from the gears, means defining a pressure balance area subjected to outlet pressure to overcome the primary force, a recess in the periphery of each plate at each end thereof supplying outlet pressure to the primary pressure balance area, means defining secondary areas between the inlet and the primary areas on the gear side of each plate subjected to pressure gradients varying with speed and applying secondary forces tending to separate the plate from the gears, means defining a pressure balance area on the remote side of each plate opposed to each secondary area, an aperture in each plate intermediate the ends of each secondary area communicating the secondary area with the opposed pressure balance area to overcome the secondary force, and a land on the periphery of each plate between the inlet and each peripheral recess beveled to deform in use on contact with the housing when subjected to high pressure, thereby to provide an effective seal between the inlet and each recess.

14 Claims, 15 Drawing Figures

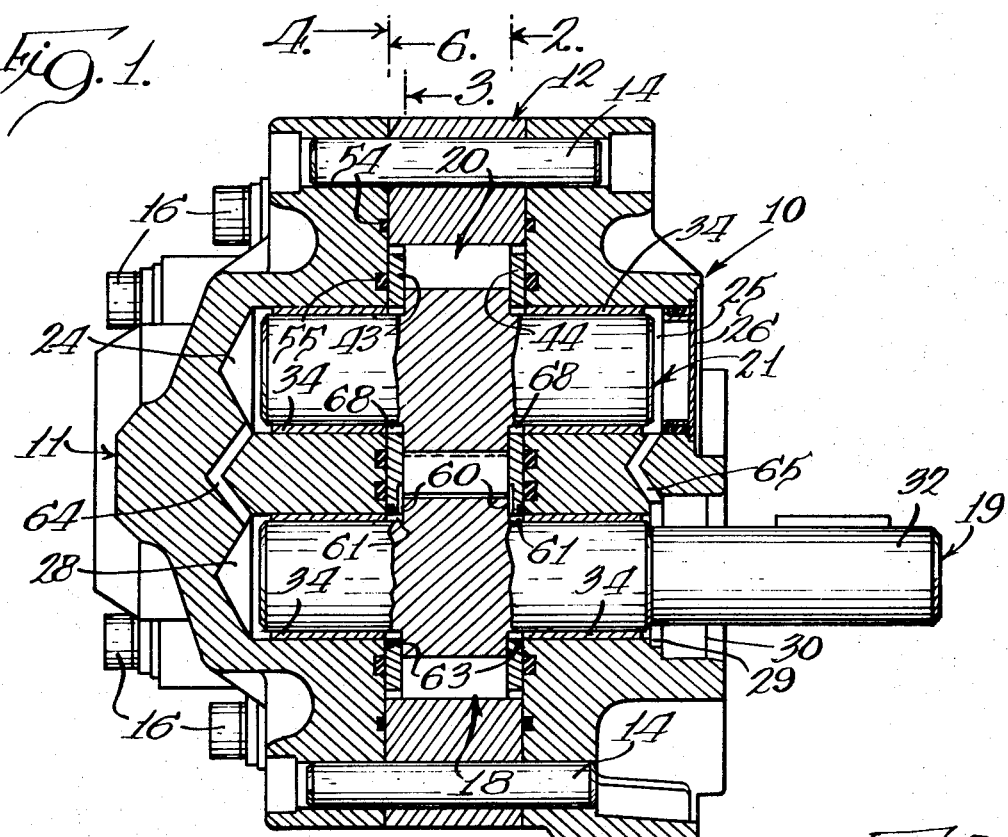

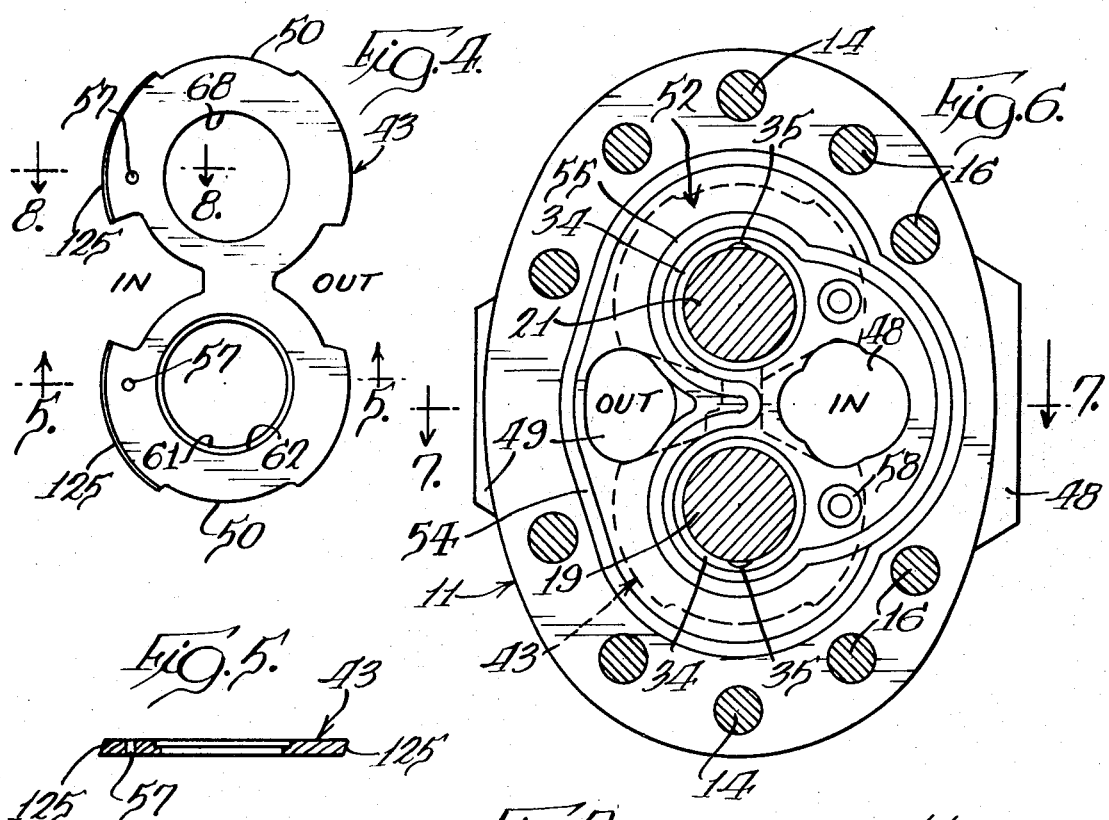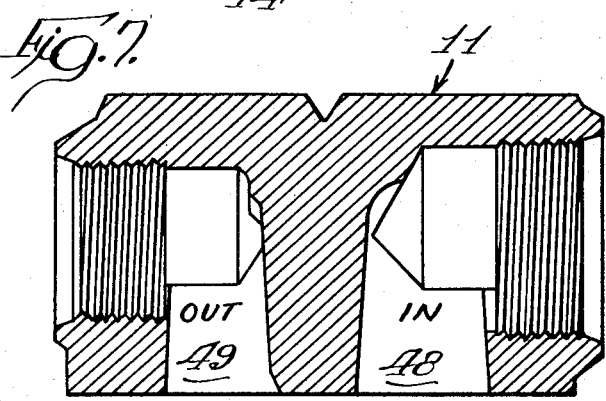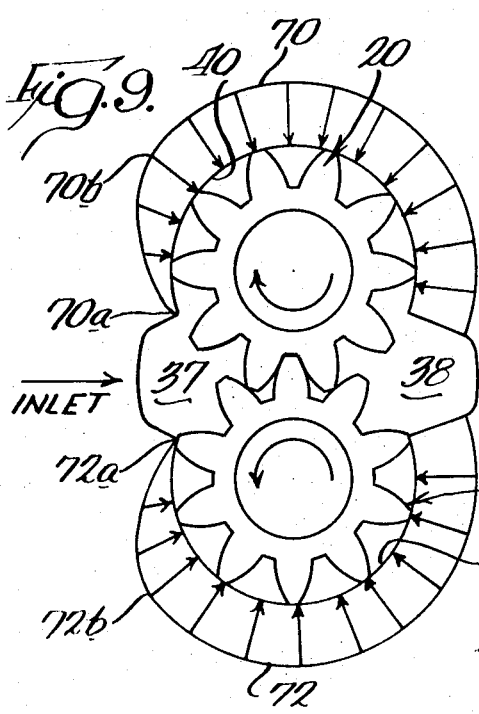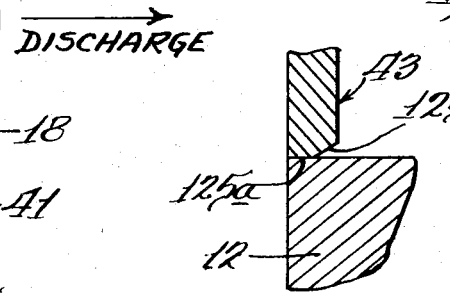

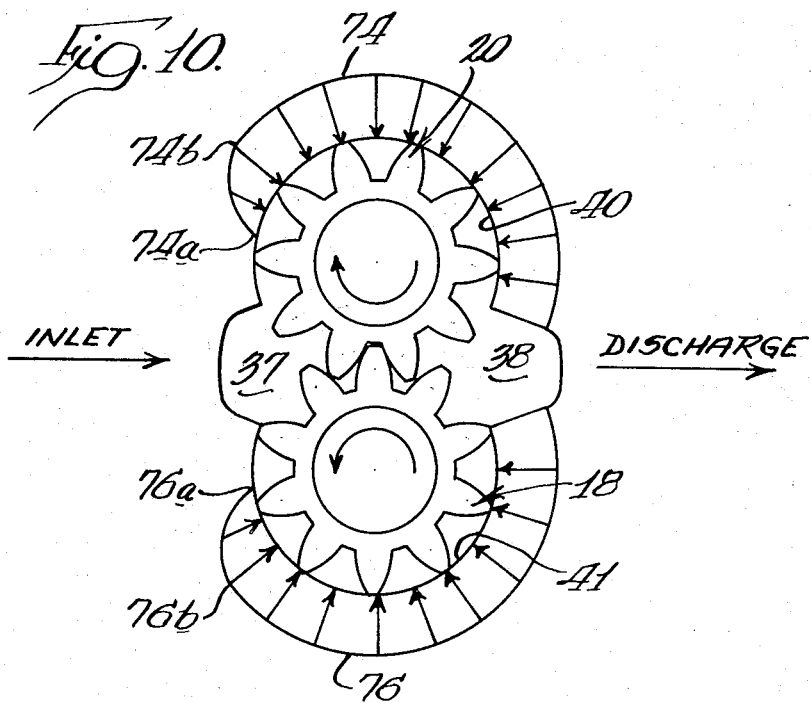
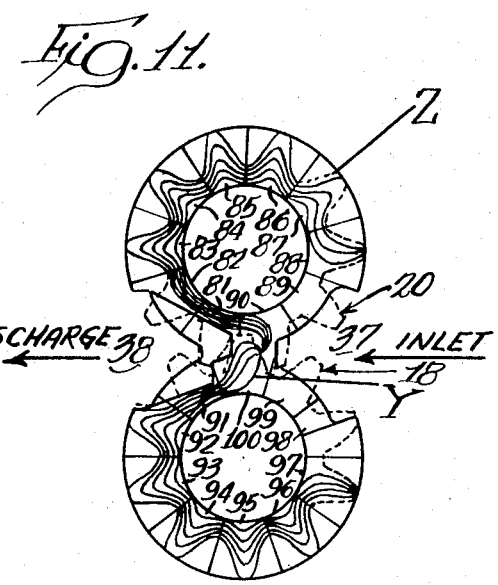
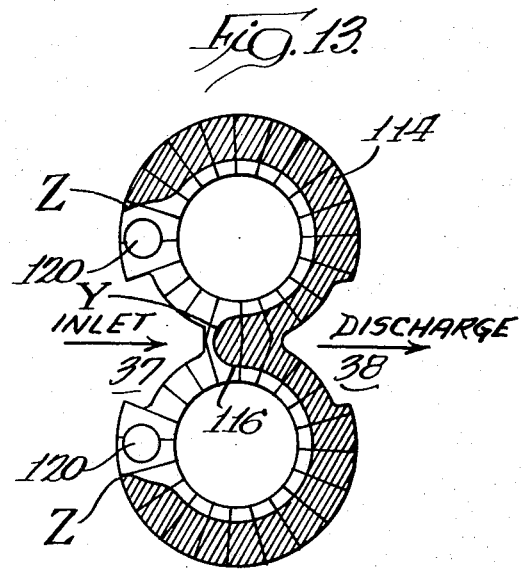
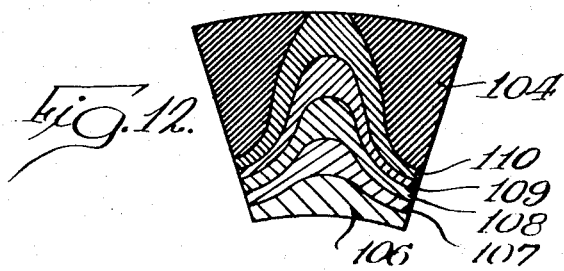

GEAR PUMP WITH SEAL PLATES

BACKGROUND OF THE INVENTION

The present invention relates to rotary gear pumps including a pair of external gear members with intermeshing teeth, and in the preferred construction illustrated herein the gear members are supported by means of a pair of parallel shafts having the gear members fixed thereon and having opposite ends extending from the gear members into bearings in a housing mounting the shafts for rotation. The housing is formed with a pair of generally cylindrical gear cavities intersecting centrally of the housing and providing a generally 8-shaped configuration. An inlet is provided at one side of the intermeshing teeth and an outlet is provided at the other side of the intermeshing teeth. The ends of the teeth at the periphery of the gears in rotating from the inlet to the outlet are closely adjacent the surrounding housing. Seal plates engage the sides of the gears.

In the past, it has been customary to provide one or more plates at one or both sides of the gears mounted for movement axially relative to the gears into sealing engagement with the sides of the gear teeth. In general, there have been three types of construction involving movable seal plates of the character mentioned, together with provision for supply of fluid under pressure to the remote side of such plates to urge the latter toward the sides of the gear teeth. One type has involved a thin flexible plate clamped at the periphery between housing members such as the center spacer member and an end cover member. In a second type, the side plates are in the form of individual bearing blocks for each shaft end of substantial thickness and mounted for movement toward the gears. In a third type there are plates of substantial thickness apparently intended to be rigid in use and floating in the sense that they are not clamped at the periphery but free to move axially.

Generally, each of the prior constructions is subject to some disadvantages. In the first mentioned construction involving one or more thin flexible plates clamped at the periphery, the remote side of the plate is often compartmented for application of pressures corresponding somewhat to pressures in the gear cavity. However, it appears that one or more areas at the remote side of the flexible plate is subjected to relatively high pressure, such as outlet pressure, greatly in excess of the pressure at the gear side of the plate, resulting in extremely high localized loads with accompanying heat and wear creating large torque losses. Further, the periphery of the flexible plate is usually clamped with some axial clearance from the gears, creating a leak path around the gears which is difficult to control. Thus, while the thin flexible plate is relatively inexpensive to manufacture, it is difficult to provide high efficiency levels in such constructions.

In the second and third constructions utilizing thick bearing blocks or side plates, the blocks or plates are not usually flexible and are often subjected to full discharge pressure intended to force the blocks or plates against the side of the gear teeth. Since the blocks or plates are not flexible, the force distribution on the remote side is generally not related to the force on the gear side tending to separate the plate from the gear. As a result, the blocks or plates often tilt and bind due to severe pressure imbalance and result in leakage due to the tilting. The unbalance and tilting loads can be quite high, causing high torque losses and subsequent wear. By changing the pressure loading pattern to more nearly match the blowoff forces, some of the performance deficiencies can be overcome to provide higher efficiencies, but production of the components requires close manufacturing tolerances and the product is expensive as well as bulky.

SUMMARY OF THE INVENTION

In the present invention, a thin floating plate is utilized at each side of the gears and is held in sealing contact with the sides of the gear teeth by a sealing force which is proportioned according to the blowoff force for all areas and for all operating conditions. Force levels are determined for each of separate sectors around the periphery of the gear in a manner to provide a complete force topography over the entire surface of the pressure balance plates at all conditions of speed and pressure, so that counterbalance forces may be accurately applied. The system provides better sealing with reduced mechanical and fluid losses and thereby creates high efficiencies with near zero fluid leakage and near zero torque losses.

In the preferred form, each pressure balance plate has a generally 8-shaped configuration adapted to fit on both shafts against one side of both gears. Provision is made for subjecting a definite primary area at the gear side of the plate to outlet pressure, so that a definite area on the remote side of the plate may be subjected to counterbalance forces overcoming the tendency of the primary force to separate the plate from the gears. The primary area extends from the outlet chamber around the gears more than half way toward the inlet chamber. Secondary areas at the gear side of each plate extend from the inlet around the gears to the primary areas. The secondary areas are subjected to a pressure gradient with pressure increasing from substantially zero at the inlet to substantially outlet pressure at the juncture of the secondary area with the primary area. Pressure at intermediate value is applied to the remote side of the plate to oppose the secondary force tending to separate the plate from the gears. While the plate may be thin enough to flex, the blowoff forces are carefully opposed as a result of which there is substantially no deformation of the plate and no localized wear or friction and also no tilting resulting in leakage.

Preferably the plate has a recess on the periphery at each end for clearly defining the primary area and for supplying fluid to the pressure balance area opposing the primary blowoff force. A land is provided on the periphery of each plate between the inlet and each recess, and the land is beveled to deform against the housing when the plate is put into use and subjected to high pressure. The deformation enables the land to conform precisely to the surrounding housing and provides excellent sealing between the inlet and the adjacent peripheral recess on the plate.

DESCRIPTION OF THE DRAWINGS

FIG. 1 is a longitudinal sectional view through a pump embodying the present invention, taken at about the line 1—1 of FIG. 2;

FIG. 2 is a cross-sectional view taken at about the line 2—2 of FIG. 1;

FIG. 3 is an elevational view of a pressure balance seal plate taken at about the line 3—3 of FIG. 1, viewing the pressure balance plate from the side in contact with the gears;

FIG. 4 is an elevational view of the pressure balance plate taken at about the line 4—4 of FIG. 1, viewing the opposite side of the plate;

FIG. 5 is a cross section taken through the seal plate at about the line 5—5 of FIG. 4;

FIG. 6 is a cross-sectional view taken at about the line 6—6 of FIG. 1, viewing the inner surface of the end housing member;

FIG. 7 is a sectional view through the housing member taken at about the line 7—7 of FIG. 6 showing the inlet and outlet ports in the housing member;

FIG. 8 is a fragmentary enlarged and exaggerated sectional view taken at about the line 8—8 in FIG. 4, but showing the relationship of the plate relative to the surrounding housing after deformation in use.

FIG. 9 is a pressure diagram illustrating a relatively gradual pressure gradient from inlet pressure to outlet pressure with a pump operated at low speed;

FIG. 10 is a pressure diagram illustrating a relatively steep pressure gradient from inlet pressure to outlet pressure with a pump operated at relatively high speed.

FIG. 11 is a diagram illustrating pressure distribution on the gear side of the seal plate tending to separate the plate from the gears.

FIG. 12 is a diagram illustrating pressure variation at the gear side of the pressure plate in a predetermined sector having a length approximately equal to the pitch of one tooth and subjected to outlet pressure.

FIG. 13 is a diagram illustrating the application of pressure balancing forces.

DESCRIPTION OF PREFERRED EMBODIMENT

Figure 14:
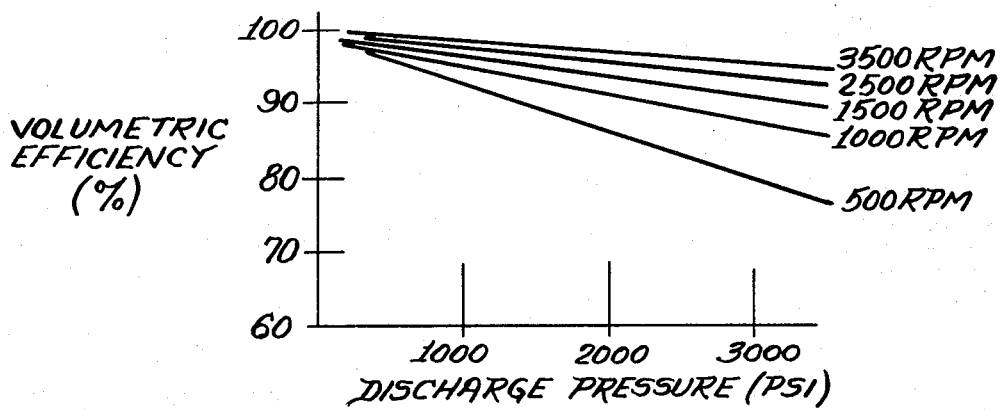
FIG. 14 is a graph illustrating volumetric efficiencies of the present pump at various discharge pressures and speeds.

Referring now to the drawings in more detail, a pump construction embodying the present invention is illustrated as including a housing comprised of three outer members including an end housing member 10 suitably constructed for mounting the pump upon an appropriate support, an end housing member 11 formed with an inlet and an outlet, and a central housing member 12 in the form of a spacer plate. The housing members 10, 11 and 12 are suitably aligned as by pins 14 at the top and bottom of FIGS. 1 and 2, and held in assembled relationship by machine bolts as at 16. The housing members define an interior cavity for the pump gears, sealing means and inlet and outlet chambers.

Drive gear 18 is formed on a drive shaft 19, and idler gear or driven gear 20 is formed on a driven shaft 21. The shafts 19 and 21 are arranged on parallel spaced axes in the housing with the teeth on the gear members meshing at a zone centrally located in the housing cavity. Opposite ends of the shaft 21 project into bore recesses 24 and 25 in the housing members 11 and 10. The bore 24 ends in the housing member 11 and the recess 25 in the housing member 10 is closed by an appropriate seal 26. Opposite ends of the shaft 19 project into bore recesses 28 and 29 in the housing members 11 and 10. The bore 28 ends in the housing member 11 and the recess 29 in the housing member 10 is closed by an appropriate seal means 30 including provision for a projecting end portion 32 on shaft 19 adapted to be connected with a suitable prime mover. Opposite end portions of the drive shaft and driven shaft are mounted in similar bearing sleeves 34 fixed in the housing recesses. In order to provide for lubrication, the interior surface of each bearing sleeve 34 includes a longitudinal groove 35 preferably located as shown in FIG. 6.

As seen in FIG. 2, an inlet chamber 37 is provided in the spacer plate 12 at one side of the zone of intermeshing gear teeth and an outlet chamber 38 is provided in the spacer plate 12 at the other side of the zone of intermeshing teeth. Both chambers extend outwardly from the spacer plate partially into the end housing members. The inlet chamber 37 is always sealed from the outlet chamber 38 by means of tooth contact in the zone of intermeshing teeth and by sealing means engaging the outer edges of the gear teeth. While the seal between the inlet chamber and the outlet chamber provided by tooth contact at the zone of intermeshing teeth is constantly changing along the line of action tangent to the base circles of the gears during rotation of the gears, the inlet chamber is generally defined at one side of the intermeshing teeth and the outlet chamber is generally defined at the other side of the intermeshing teeth. The outer tips of the gear teeth rotating from inlet to outlet contact inner surfaces of the spacer plate 12 as at 40 and 41 which define generally cylindrical gear cavities intersecting at the zone of intermeshing teeth. The sides of the gear teeth are sealed by means of pressure balanced seal plates 43 and 44 generally of 8-shaped configuration fitted around the shafts and against opposite sides of the gears in cavities 40 and 41 in the spacer plate.

The inlet chamber 37 communicates with an axially disposed inlet passage 48 FIGS. 6 and 7 in the end housing member 11 having a laterally directed internally threaded terminus, and outlet chamber 38 communicates with an axially disposed outlet passage 49 in the end housing member 11 having a laterally directed internally threaded terminus. If desired, the threaded ends of passages 48 and 49 may be axially disposed.

In order to urge the pressure balance plates 43 and 44 into sealing engagement with the sides of the gear teeth, fluid is supplied to the outside of the plates. In general, as best seen in FIG. 3, the plate 43 is formed at each end on the periphery with a portion of reduced radius as at 50 to permit uniform distribution of the high pressure outlet fluid along a predetermined portion of the gear side of the plate and behind the plate into an area 52 (FIG. 6) between a pair of sealing rings 54 and 55 in housing member 11, so that the area 52 is subjected to pressure corresponding generally to that in the outlet chamber. At opposite sides of the inlet chamber 37, the plate 43 is formed with ports 57 which admit fluid to the outside of the plate in areas within circular O-rings 58 in housing member 11 at pressure intermediate the outlet pressure and the inlet pressure. The remaining area within ring 55 is at approximately inlet pressure due to exposure to inlet passage 48. The gear side of the plate 44 is a mirror image of the gear side of the plate 43, and the outside of the plate 44 is subjected to fluid pressure similar to that supplied at the outside of plate 43.

In order to provide for lubrication of the opposite ends of the drive shaft and driven shaft in the bearings 34, lubricating fluid is pumped from trapped fluid in a sealed chamber at the zone of intermeshing teeth where the spaces between teeth decrease in volume, outwardly along the end portions of drive shaft 19, across to the end portions of driven shaft 21, and back inwardly along the latter to the inlet let chamber.

In order to take lubricating fluid under pressure from the zone of intermeshing teeth, each of the pressure balanced plate 43 and 44 is formed on the gear side adjacent the drive shaft 19 with a groove as at 60 (FIGS. 1, 3 and 7) which extends from the intermeshing teeth inwardly toward the shaft. The groove 60 terminates at the inner end in communication with an annular channel as at 61 around the shaft defined radially by the inner surface of the pressure balance plate and the outer surface of the shaft, and defined axially by the inner end of the bearing sleeve and the outer surface of the gear. The annular channel 61 communicates with the inner end of longitudinal groove 35 in the adjacent bearing sleeve 34 so that lubricating fluid may flow longitudinally outwardly along the drive shaft to the bearing recesses 28 and 29. In order to seal the high pressure fluid in the annular channel 61, a groove 62 (FIG. 4) in the outer surface of each pressure plate around the drive shaft includes an O-ring 63 engaging the adjacent housing member.

In order to communicate the outer end of the bearing recess 28 with the outer end of the bearing recess 24, the end housing member 11 is formed with a passage 64 which conducts lubricating fluid from the recess 28 to the recess 24. End housing member 10 includes a passage 65 communicating the bearing recess 29 and the bearing recess 25 to permit lubricating fluid to flow to the latter. Lubricating fluid in the recesses 24 and 25 flows inwardly along the driven shaft through the grooves 35 in bearing sleeves 34 to annular channels as at 68 surrounding the driven shaft at opposite sides of the idler gear, like those at 61 on the drive shaft. Each annular channel 68 communicates with the pump inlet chamber 37 by means of a recess as at 69 in the face of the pressure plate adjacent the idler gear extending from annular channel 68 radially outwardly to the inlet chamber.

The lubricating circuit is described in more detail in our copending application Ser. No. 110,179, filed Jan. 27, 1971.

Considering the pressure plates 43 in more detail, it will be noted on reference to FIG. 2 that the gear 20 includes six teeth in the gear cavity 40 between the inlet 37 and the outlet 38, while the gear 18 includes seven teeth in the gear cavity 41 between the inlet 37 and the outlet 38. Thus, the length of the arc of rotation of the gears in the gear cavities may be said to correspond approximately to the pitch of six teeth. According to the present invention, each such arc of rotation is considered as involving separate sectors each corresponding respectively to the pitch of one tooth. It is contemplated that the pressure in each sector at the gear side of each pressure plate will be accurately counterbalanced in a manner to take into account varying pressures around the periphery of the gears within the arc of rotation in each gear cavity. The force in each sector tending to separate the plate from the gear is slightly overbalanced, by about 10 percent for example, in order to insure that both plates are effectively held in sealed relationship against the sides of the gear teeth in a manner to avoid significant deflection of the plates and in a manner to avoid localized loads and accompanying wear and torque losses.

As will appear, means is provided to assure that a definite predetermined primary area at the gear side of each plate is subjected to outlet pressure. In the preferred construction illustrated, the primary area includes the intermeshing teeth immediately adjacent the outlet chamber, the outlet chamber, and approximately four sectors in the arc of rotation in the gear cavity from the outlet chamber around the gear teeth toward the inlet, corresponding approximately to the pitch of four teeth. The remaining portion in the arc of rotation in the gear cavity of about two sectors corresponding approximately to the pitch of two teeth, from the inlet to each primary area, is exposed to varying pressure increasing from substantially zero at the inlet to substantially outlet pressure at the juncture of the secondary area with the primary area. At varying speeds, the pressure gradient from the inlet to the primary area varies.

In particular, referring to FIG. 9, a pressure gradient line 70 is drawn from the inlet 37 around gear cavity 40 to outlet 38, and a similar pressure gradient line 72 is drawn from inlet 37 around gear cavity 41 to outlet 38. The pressure gradient lines 70 and 72 are drawn to indicate operation of the pump at relatively slow speeds, when the pressure rises gradually from the origin 70a, 72a of each line beginning at the edge of the inlet chamber 37 to a maximum value at 70b, 72b. In contrast, in FIG. 10, pressure gradient lines 74 and 76 are drawn to indicate pump operation at relatively high speeds, when each pressure gradient line beings at origin 74a, 76a, displaced from the inlet chamber 37 and rises abruptly to maximum pressure at 74b, 76b corresponding to the location of 70b, 72b in FIG. 9.

The difference in operation in FIGS. 9 and 10 may be explained as follows. The pressure drop across a given leakage path varies as the square of the fluid velocity. That is, as the fluid velocity increases, the pressure drop also increases. During operation at high speeds, the gears rotate faster, and the gear tip velocity increases. Since fluid leakage in the example given is in a direction opposite to the movement of the gear tip, the velocity of fluid leaking relative to the gear tip is greater. This results in a higher pressure drop across the tip and a consequent lower pressure at any given point spaced along the leak path from the high pressure. The problem of varying pressures in the areas described during operation at different speeds results in difficulty in providing properly balanced seal plates providing optimum results at all speeds, for the reason that it is not possible to apply a constant pressure balancing force because a constant force will not be proportional to the varying forces tending to separate the plate at varying speeds. While full pressure is shown to be attained at 70b, 72b in FIG. 9, and at 74b, 76b in FIG. 10, for convenience of demonstrating pressure gradient, it should be understood that in varying pump constructions, full pressure may actually be attained at various positions along the arc of rotation toward the outlet chamber, in the absence of special provisions to distribute outlet pressure.

In FIG. 11, a pressure balanced seal plate 43 is illustrated, with a pressure pattern superimposed to show the pressures acting on the gear side of the plate tending to separate the plate from the gears in each of a plurality of sectors in the path of rotation of each of the gears.

In particular, each sector corresponds to the pitch of one tooth and encompasses a tooth centrally located in the sector. For example, considering the upper gear 20, note the sectors 81, 82, 83, 84, 85, 86, 87, 88, 89, 90. Similarly, around the lower gear 18 there are sectors 91, 92, 93, 94, 95, 96, 97, 98, 99 and 100. In a pump construction of the type under consideration, full discharge pressure normally exists in the outlet chamber 38, in the zone of intermeshing teeth at the side of the line of action communicating with the outlet chamber, and in a number of the sectors, such as approximately 81, 82, 83, 84 and 85 associated with gear 20 and approximately 91, 92, 93, 94 and 95 associated with gear 18. Under such circumstances pressure would rise from the inlet chamber 37 gradually through sectors 90, 89, 88, 87 and 86 associated with gear 20, and sectors 100, 99, 98, 97 and 96 associated with gear 18. The actual location where full pressure is attained may vary under various operating conditions.

In the present construction, provision is made for defining a clearly delineated area in which discharge pressure exists. In particular, the recess 50 in the periphery of the seal plate at each end extends approximately from the sector 84 to the sector 87 associated with gear 20, and from the sector 94 to the sector 96 associated with the gear 18. The recesses 50 assure distribution of discharge pressure to the end of the recess nearest the inlet and result in definition of a primary pressure area approximately in the shape of an E (FIG. 11) extending from the zone of intermeshing teeth at the outlet chamber and around both gears. The middle terminus of the primary pressure area is designated at Y and each end terminus is designated at Z. Since only a limited portion, if any, of sectors 88 and 97 are included, for practical purposes the primary area ends approximately at the sector 87 and approximately at the sector 96.

As shown in FIG. 12, full outlet pressure exists in the spaces between the gear teeth in the primary area as represented by the crosshatching at 104. At the inner periphery of the seal plate, the pressure is substantially zero as indicated by the crosshatching at 106. Alongside the gear and the gear teeth, the pressure varies gradually from zero at 106 to full outlet pressure at 104. In FIG. 12, the variation is shown in four intermediate steps, 107, 108, 109 and 110, for purposes of illustration. If the full outlet pressure is 3500 psi, the variation in each step is approximately 700 psi. FIG. 12 demonstrates the manner in which the forces in each sector in the primary area tending to separate the plate from the gears may be accurately determined in order to provide an appropriate overbalancing force to adequately hold the plate in sealing relationship with the gears while at the same time avoiding application of undue forces tending to distort the plate and create wear or leakage.

In FIG. 11, each area leading from the zone of intermeshing teeth through the inlet around gear 20 and around gear 18 to the primary area is referred to as a secondary area which is subjected to varying pressure as described in connection with FIGS. 9 and 10.

Referring now to FIG. 13, as well as FIG. 6, it will be noted that the sealing ring 55 in the end housing member defines the inner perimeter of a pressure balance area 114 on the remote side of plate 43 opposing the primary force tending to separate the plate. From the inner perimeter defined by the ring 55, the pressure balance area 114 extends outwardly to the outer edge of the plate. The pressure balance area corresponds approximately to the primary area on the gear side of the plate and has a generally 3-shaped configuration (FIG. 13) encompassing the zone of intermeshing teeth as at 116, the outlet chamber 38, and a plurality of sectors around each of the gears. The primary pressure balance area terminates at each end at a position spaced from the beginning of the gear cavity a distance corresponding to the pitch of one and a half to two teeth, which assures adequate sealing of the inlet chamber from each recess 50. The outer perimeter of the primary pressure balance area 114 lies within the chamber 52 (FIG. 6) which has an outer perimeter defined by the sealing member 54 in the end housing member. It will be understood that fluid at outlet pressure is supplied to the primary pressure balance areas 114 by virtue of the recesses 50 at opposite ends of the plate and by virtue of limited clearance along the periphery of the plate at the outlet side of the pump due to shifting toward the inlet which results from discharge pressure.

Opposed to each of the secondary areas having pressure tending to separate the plate from the gears are secondary pressure balance areas 120 on the remote side of each plate lying within the circular O-ring seals 58 (FIG. 6) in the end housing member. Referring to FIG. 6, the O-rings 58 are located approximately centrally between the sealing member 55 and the edge of inlet 48. Within such space limitations the areas 120 are made as large as practicable. Fluid at appropriate pressure to provide the necessary counterbalance force is supplied to each chamber 120 through the aperture 57 (FIGS. 3 and 4) located centrally relative to chamber 120. In order to utilize pressures at appropriate values in the pressure gradient, the aperture is angularly elongated at the gear side of the plate as illustrated by the groove at 57a (FIG. 3).

More particularly, as the leading edge of a gear tooth passes the groove or slot 57a, the pressure increases from the beginning of the slot adjacent the inlet chamber 37 to the end of the slot remote from the inlet chamber. It is desirable to utilize the pressure at the end of the slot remote from the inlet chamber to provide adequate counter balance forces. However, as soon as the trailing edge of the gear tooth passes the pressure balance chamber 120, the pressure at the gear side of the plate subsides, and the fluid trapped in chamber 120 would unduly bias the wear plate toward the gears if the inlet to port 57 is limited to an area at the end of slot 57a remote from inlet chamber 37. It is desirable to begin to relieve the pressure in chamber 120 as soon as the gear tooth trailing edge passes over the secondary balance area. Thus, the elongation 57a enables pressure buildup till the leading edge of a tooth passes the remote end of the slot and facilitates pressure relief as soon as the trailing edge of the tooth passes the near end of the slot. The length of the slot is slightly less than the thickness of a tooth.

In order to assure adequate seal along the periphery of each pressure plate between the inlet chamber and the end of recess 50, the plate is formed of appropriate material such as an aluminum alloy with a land 125 (FIGS. 3, 4 and 8) which is formed with a slight bevel on the order of ½° to 3½° as best seen in FIG. 8. In use, when the pump develops high pressure in the outlet chamber, such pressure acts on the periphery of the gear plate adjacent the outlet chamber and tends to force the gear plate laterally toward the inlet chamber, as a result of which the beveled edge 125 is forced against the surrounding gear cavity wall in the central spacer plate 12. The force is adequate to flatten the beveled edge as shown at 125a (FIG. 8) in a manner such that the edge may conform with the gear cavity wall and any irregularities therein to provide a tight seal between the inlet chamber and the recess 50. In this way, the fluid at high pressure in the primary pressure area, in the recess 50, and in the pressure balance area 114, is separated from the varying pressure along the gradient from the inlet chamber to the end of recess 50. In order to simplify manufacture, the lands at the periphery of the plate adjacent the outlet are beveled also.

Figure 15:
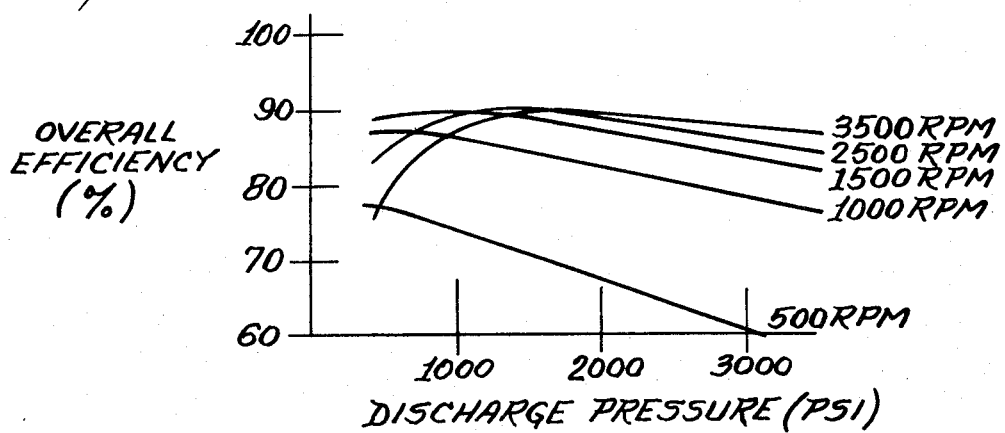
FIG. 15 is a graph illustrating overall efficiencies in the present pump at various discharge pressures and speeds.

The curves in FIGS. 14 and 15 demonstrate the high degree of volumetric and overall efficiency provided in a construction embodying the present invention.

We claim:

1. A high pressure rotary gear pump, comprising:
    a. a housing having a pair of gear cavities,
    b. a pair of gears in the cavities having gear teeth intermeshing,
    c. an inlet chamber at one side of the intermeshing teeth,
    d. an outlet chamber at the other side of the intermeshing teeth,
    e. a pair of shafts respectively carrying said gears,
    f. a floating seal plate against one side of the gears having a central portion in the inlet chamber exposed to inlet pressure,
    g. means defining a primary area exposed to outlet pressure on the gear side of the seal plate extending from the intermeshing teeth adjacent the outlet chamber and around the gears at least half way toward the inlet chamber applying a primary force tending to separate the plate from the gears,
    h. means defining a pressure balance area on the remote side of the plate opposed to said primary area and of proportions sufficient to overcome the primary force and hold the plate against the gears when such balance area is exposed to outlet pressure,
    i. means for supplying outlet pressure to the primary pressure balance area,
    j. means defining secondary areas exposed to varying pressure on the gear side of the plate increasing from the intermeshing teeth adjacent the inlet chamber around each gear toward the outlet chamber to the primary area applying secondary forces tending to separate the plate from the gears,
    k. means defining a pressure balance area on the remote side of the plate opposed to each secondary area and of predetermined proportions sufficient to overcome the secondary force when such balance area is subjected to predetermined pressure, and
    l. means for supplying pressure at a predetermined value intermediate inlet pressure and outlet pressure from the gear side of the plates to the secondary balance areas.

2. A pump as defined in claim 1, wherein the means defining the primary and secondary areas on the gear side of the plate includes
    a recess in the periphery of the plate extending around the plate from a position normally at outlet pressure to a position normally less than outlet pressure but subjected to outlet pressure by the recess, and
    means on the periphery of the plate engaging the housing and sealing the secondary area from the primary area.

3. A pump as defined in claim 1, wherein the means defining the primary pressure balance area includes
    sealing members between the remote side of the plate and the housing, and
    the means defining each secondary pressure balance area includes a sealing ring between the remote side of the plate and the housing communicating with the gear side of the plate between the inlet and the primary area.

4. A high pressure rotary gear pump, comprising:
    a. a housing having a pair of generally cylindrical gear cavities intersecting centrally of the housing,
    b. a pair of external gears in the cavities having gear teeth intermeshing at a zone centrally of the housing,
    c. an inlet chamber at one side of the zone of intermeshing teeth where the spaces between intermeshing teeth increase in volume,
    d. an outlet chamber at the other side of the zone of intermeshing teeth where the spaces between the intermeshing teeth decrease in volume,
    e. a pair of shafts respectively carrying said gears fixed thereon and having opposite ends mounted in the housing,
    f. a pair of generally 8-shaped seal plates around the shafts against opposite sides of the gears,
    g. a recess in the periphery of each plate at each end defining a primary area exposed to outlet pressure on the gear side of each seal plate from the zone of intermeshing teeth adjacent the outlet chamber and around the gears more than half way toward the inlet chamber applying primary force tending to separate the plate from the gears,
    h. means defining a pressure balance area on the remote side of each plate opposed to said primary area and of proportions sufficient to overcome the primary force and hold the plate against the gears when such balance area is exposed to outlet pressure,
    i. said recess supplying outlet pressure to the primary pressure balance area,
    j. a land on the periphery of each plate between the inlet and each recess sealing each recess from the inlet and defining secondary areas subject to varying pressure on the gear side of each plate increasing from the zone of intermeshing teeth adjacent the inlet chamber around the gears toward the outlet chamber to the primary area applying a secondary force tending to separate the plate from the gears, k. means defining a pressure balance area on the remote side of each plate opposed to each secondary area and of predetermined proportions sufficient to overcome the secondary force when such balance area is subject to predetermined pressure, and l. an aperture in the plate intermediate the ends of each secondary area for supplying pressure at a predetermined value intermediate inlet pressure and outlet pressure from the gear side of the plates to the secondary balance areas.

5. A pump as defined in claim 4 wherein the means defining each primary pressure balance area includes a sealing ring in the housing at the remote side of each plate in approximately a 3-shaped pattern at the inner perimeter of the primary pressure balance area providing approximately a 3-shaped area encompassing the zone of intermeshing teeth and the outlet.

6. A pump as defined in claim 4 wherein the means defining each secondary pressure balance area includes a circular O-ring in the housing at the remote side of each plate.

7. A pump as defined in claim 4 wherein the length of each land corresponds approximately to the pitch of one and a half to two teeth.

8. A pump as defined in claim 4 wherein each land adjacent the inlet is beveled to deform in use in the pump when subjected to high pressure.

9. A high pressure rotary gear pump, comprising,
 a. a housing having a pair of generally cylindrical gear cavities intersecting centrally of the housing,
 b. a pair of external spur gears in the cavities having gear teeth intermeshing at a zone centrally of the housing,
 c. an inlet chamber at one side of the zone of intermeshing teeth where the spaces between intermeshing teeth increase in volume,
 d. an outlet chamber at the other side of the zone of intermeshing teeth where the spaces between the intermeshing teeth decrease in volume,
 e. a pair of shafts respectively carrying said gears fixed thereon and having opposite ends mounted in the housing,
 f. a pair of thin generally 8-shaped floating seal plates around the shafts against opposite sides of the gears forming with the intermeshing teeth a seal between the inlet and outlet and sealing the gear teeth rotating from the inlet chamber to the outlet chamber,
 g. a primary area exposed to outlet pressure on the gear side of each seal plate from the zone of intermeshing teeth adjacent the outlet chamber and around the gears more than half way toward the inlet chamber applying primary force tending to separate the plate from the gears,
 h. a sealing ring in the housing at the remote side of each plate defining the inner perimeter of a pressure balance area on the remote side of each plate opposed to said primary area and of proportions sufficient to slightly overcome the primary force and hold the plate against the gears when such balance area is exposed to outlet pressure,
 i. a recess in the periphery of each plate at each end thereof extending from a position normally at outlet pressure around the periphery of the plate to a position normally at less than outlet pressure to define the primary area and supply fluid at outlet pressure to the primary pressure balance area,
 j. a land on the periphery of each plate between the inlet and each recess engaging the housing and sealing the recess from the inlet thereby defining secondary areas subject to varying pressure on the gear side of each plate increasing from the zone of intermeshing teeth adjacent the inlet chamber around the gears toward the outlet chamber to the primary area applying a secondary force tending to separate the plate from the gears,
 k. an O-ring in the housing at the remote side of each plate defining a pressure balance area on the remote side of each plate opposed to each secondary area and of predetermined proportions sufficient to overcome the secondary force when such balance area is subject to predetermined pressure, and
 l. an aperture in the plate intermediate the ends of each secondary area for supplying pressure at a predetermined value intermediate inlet pressure and outlet pressure from the gear side of the plates to the secondary balance areas.

10. A pump as defined in claim 9 wherein the sealing ring defining the inner perimeter of the primary pressure balance area is arranged approximately in a 3-shaped pattern providing approximately a 3-shaped pressure balance area encompassing the zone of intermeshing teeth and the outlet, and each O-ring defining a secondary pressure balance area is circular.

11. A pump as defined in claim 9 wherein the length of each land is approximately the pitch of one and a half to two teeth, and each land is beveled to deform in use in the pump when subjected to high pressure, thereby to conform with the surrounding housing and provide an effective seal between the inlet and the primary area.

12. A pump as defined in claim 1, wherein the means for supplying pressure fluid to each secondary balance area includes a port through the seal plate centrally of the secondary balance area, and an inlet groove in the face of the plate adjacent the gears communicating with the port and elongated relative to the port in the direction of gear tooth movement.

13. A pump as defined in claim 12, wherein the end of said groove remote from the inlet chamber is located to provide suitable pressure for appropriate counterbalance forces as the leading edge of a tooth passes, and the end of the groove adjacent the inlet chamber is located to relieve pressure in the secondary balance area when the trailing edge of a tooth is opposite the secondary balance area.

14. A pump as defined in claim 13, wherein the length of the groove is slightly less than the thickness of a tooth, and the trailing end of the groove is aligned with the port.

* * * * *